Patented Sept. 25, 1928.

1,685,698

UNITED STATES PATENT OFFICE.

JOSEF HALLER, OF WIESDORF, NEAR COLOGNE-ON-THE-RHINE, GERMANY, ASSIGNOR TO GRASSELLI DYESTUFF CORPORATION, OF NEW YORK, N. Y., A CORPORATION OF DELAWARE.

HALOGENIDES OF AROMATIC OXAMINIC ACIDS.

No Drawing. Application filed November 26, 1926, Serial No. 151,006, and in Germany November 25, 1925.

The present invention relates to processes for the production of aromatic oxaminic acid halogenides, and to certain new products obtainable thereby.

Halogenides of aromatic oxaminic acids derived from primary aromatic amines could, heretofore, only be produced with difficulty (see Berichte d. Deutschen Chem. Ges. vol. 23, page 1823, (1890)).

The action of oxalylchloride upon secondary bases, such as monoethylaniline or diphenylamine, produces the halogenides of the corresponding oxaminic acids; with free primary bases, such as aniline or the naphthylamines, the action of oxalylhalogenides does not lead to the desired results.

I have discovered that by reacting with oxalylhalogenides upon the salts of aromatic primary amines there are produced the halogenides of the corresponding oxaminic acids.

The reaction can be performed, particularly in the case of the chloride, with a small or a large excess of the chloride or in the presence or absence of an indifferent diluent, or solvent. The resulting oxaminic chlorides usually separate in crystalline form; in instances where they are more or less soluble in the diluent it is possible to precipitate them by the addition of petroleumether.

The reaction usually proceeds at ordinary temperature, i. e., at a temperature of from about 10° to about 30° C. In certain cases it may be advisable to induce the reaction by slight heating, i. e., to a temperature of about 40° C., as for instance in the preparation of the new o-toluyloxaminic acid chloride, obtained, by practicing the process according to the present invention, as yellow needles having the melting point of 89–90° C.; or of the new alphanaphthyl-oxaminic acid chloride (occurring in the crystalline form as yellowish needles, melting at 86° C.) etc.

My process is particularly applicable to the production of the chlorides of aromatic oxaminic acids.

The following examples will further illustrate my invention, the parts being by weight.

Example 1.—50 parts of finely ground aniline hydrochloride are quickly introduced at ordinary temperature (i. e., 15°–40° C.) into 200 parts of well stirred oxalylchloride. The aniline salt dissolves at first with violent evolution of hydrochloric acid gas, but soon the reaction mass solidifies to a magma of colorless needles which liquefy on slight heating. The excess oxalylchloride is distilled off under reduced pressure and the residue crystallized from ligroin; the known phenyl-oxaminic acid chloride of the formula

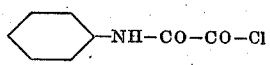

is obtained. It melts at 82–85° C., in accordance with the statements in the literature. The yield is nearly quantitative.

Example 2.—100 parts of beta-naphthylamine hydrochloride are suspended in 400 parts of chlorobenzene and at about 10° C. 100 parts of oxalylchloride are added. The resulting reaction mass is well stirred and the temperature allowed to increase; evolution of hydrochloric acid gas beginning at about 15° C. The resulting oxaminic acid chloride starts to separate from the reaction mass after some stirring at room temperature.

After the evolution of hydrochloric acid gas has ceased, petroleumether is added to complete the precipitation. The new beta-naphthyl-oxaminic acid chloride of the formula

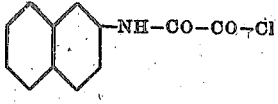

is so obtained. Crystallization from benzene produces it as nearly colorless, soft needles, melting with decompositon at 114–115° C.

Example 3.—50 parts of 8-chloro-1-naphthylamine hydrochloride are suspended in 200 parts of nitrobenzene and at about from 5–10° C., 35 parts of oxalylchloride are added. The mass is well stirred and the temperature allowed to increase slowly to about 40° C. After cooling ligroine is added to precipitate the new 8-chloro-1-naphthyl-amine oxaminic acid chloride in the form of colorless needles melting at 161° C.

The new 8-methoxy-1-naphthyl oxaminic acid chloride obtained in an analogous way crystallizes from chloro-benzene in yellow needles melting at 172° C.

Instead of isolating the oxaminic acid chloride as described above, it is also possible to separate it from the excess oxalylchloride by distilling it off with the chlorobenzene solution under reduced pressure; the so obtained chlorobenzene solution of the oxaminic acid chloride can be used directly for many technical purposes.

I claim:—

1. In processes for the production of an oxaminic acid halogenide of a primary aromatic amine, the step consisting in reacting with an oxalylhalogenide upon a salt of a primary aromatic amine.

2. In processes for the production of an oxaminic acid chloride of a primary aromatic amine, the step consisting in reacting with oxalylchloride upon a salt of a primary aromatic amine.

3. In processes for the production of an oxaminic acid chloride of a primary aromatic amine, the step consisting in reacting with oxalylchloride upon the hydrochloride of a primary aromatic amine.

4. In processes for the production of an oxaminic acid chloride of a primary aromatic amine, the step consisting in reacting, at a temperature of from about 10° to about 40° C., with oxalylchloride upon the hydrochloride of a primary aromatic amine.

5. Process for the production of an aryl oxaminic acid chloride of the naphthalene series which comprises reacting with oxalylchloride upon a hydrochloride of a primary naphthylamine compound.

6. As new articles of manufacture oxaminic acid halogenides of the naphthalene series being solid products splitting off hydrogen-halide upon treatment with water.

7. As new articles of manufacture oxaminic acid chlorides of the naphthalene series being solid products splitting off hydrochloric acid upon treatment with water.

8. As new products, the compounds of the general formula:

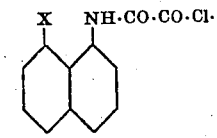

wherein X stands for one of the substituents chlorine and methoxy.

9. As a new product, the compound of the formula:

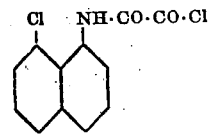

which forms colorless needles, melting at 161° C.

In testimony whereof, I affix my signature.

JOSEF HALLER.